Sept. 28, 1948.   L. B. GILBERT ET AL   2,450,396
CHAIN FORMING MACHINE
Filed Jan. 10, 1945   8 Sheets-Sheet 1

Fig. 1

INVENTORS
LOWELL B. GILBERT AND RAYMOND J. KIEFFER
BY
Beau, Brooks, Buckley & Beau. ATTORNEYS Sept. 28, 1948.  L. B. GILBERT ET AL  2,450,396
CHAIN FORMING MACHINE Filed Jan. 10, 1945　　　　　　　　　　　　　8 Sheets-Sheet 2

INVENTORS
LOWELL B. GILBERT AND RAYMOND J. KIEFFER
BY
Bean, Brooks, Buckley & Bean.  ATTORNEYS Sept. 28, 1948.　　L. B. GILBERT ET AL　　2,450,396
CHAIN FORMING MACHINE Filed Jan. 10, 1945　　　　　　　　　　8 Sheets-Sheet 3

INVENTORS
LOWELL B. GILBERT AND RAYMOND J. KIEFFER
BY
Bean, Brooks, Buckley & Bean, ATTORNEYS Sept. 28, 1948. L. B. GILBERT ET AL 2,450,396
CHAIN FORMING MACHINE
Filed Jan. 10, 1945 8 Sheets-Sheet 4

Fig. 4.

INVENTORS
LOWELL B. GILBERT AND
BY RAYMOND J. KIEFFER
Bean, Brooks, Buckley & Bean
ATTORNEYS Sept. 28, 1948.   L. B. GILBERT ET AL   2,450,396
CHAIN FORMING MACHINE Filed Jan. 10, 1945   8 Sheets-Sheet 5

INVENTORS
LOWELL B. GILBERT AND
BY RAYMOND J. KIEFFER
Bean, Brooks, Buckley & Bean. ATTORNEYS Sept. 28, 1948. L. B. GILBERT ET AL 2,450,396
CHAIN FORMING MACHINE Filed Jan. 10, 1945 8 Sheets-Sheet 6

INVENTORS
LOWELL B. GILBERT AND
BY RAYMOND J. KIEFFER
Beau, Brooks, Buckley & Beau
ATTORNEYS

Sept. 28, 1948.    L. B. GILBERT ET AL    2,450,396
CHAIN FORMING MACHINE Filed Jan. 10, 1945    8 Sheets-Sheet 7

INVENTORS
LOWELL B. GILBERT AND RAYMOND J. KIEFFER
BY
Bean, Brooks, Buckley & Bean. ATTORNEYS Patented Sept. 28, 1948

2,450,396

UNITED STATES PATENT OFFICE 2,450,396

CHAIN FORMING MACHINE

Lowell B. Gilbert, Kenmore, and Raymond J. Kieffer, Tonawanda, N. Y., assignors to Columbus McKinnon Chain Corporation, Tonawanda, N. Y., a corporation of New York Application January 10, 1945, Serial No. 572,168

24 Claims. (Cl. 59—27)

It is well known to those skilled in the art that in chain forming machines a piece of link stock of suitable length is supported against a mandrel around which the ends of the stock are bent in the formation of the link by means of suitable rollers carried by the forming slides of the machine. These forming slides are usually operated by means of face cams giving motion in both directions. Since the amount of forward and reverse movements of the slides produced by such cam must be relatively great and since the reverse movement must rapidly follow the forward movement, both movements being accomplished in a relatively small arc of rotation, it is obvious that the cam must have very steep sides and a sharp apex. As is well known, such a cam must of necessity be operated at a relatively low rate of speed in order to avoid the shock of impact resulting from the inertia at the beginning of the forming stroke and when the slide is stopped and reversed at the end of such stroke.

The principal object of our invention has been to provide a machine having cams with sides which have relatively gradual inclination towards the apex, thereby eliminating much of the abruptness of operation and the resulting shock of impactive action.

Another object has been to design a machine of this type which because of its cam formation may be operated at a greatly increased speed thereby increasing the output of the machine.

A further object has been to provide a machine having constantly rotating intermittent forming cams operating the slides upon their forming stroke only during any selected rotation.

A further object has been to provide a cam for actuating each of the forming slides having a movable part operable to slide-operating position or to idle-stroke position.

Another object has been to provide means operable in synchronism with the forming slide roller for automatically shifting the movable part of the cam to either of its positions.

Another object has been to provide a shifter track engageable with means carried by the movable cam part for maintaining said part in either of its positions and a deflector for guiding said means for passage either on the inside or outside of the shifter track.

Moreover, means are provided in our machine for holding the deflector stationary while the movable cam element is being guided from one of its positions to the other.

The above objects and advantages have been accomplished by the device shown in the accompanying drawings of which.

Our machine comprises a housing 20 which is formed with suitable bearings for the rotatable support of the various shafts of the device.

The machine is provided with the usual mandrel cam 21; twister cam 22; pressure finger cam 23; twister reciprocating cams 24 and 25; stock holding cam 26; and stock feeding cam 27. These parts are merely indicated and are not further shown or described since they are well known to those skilled in the art and do not form part of our invention.

Our machine is driven preferably by means of an electric motor 30 which is connected to the main drive shaft 31 through the medium of reducing gears 32 and a connecting clutch 33. The main drive shaft 31 carries a main shaft pinion 34 which is connected, through the medium of an idler 35 to a countershaft gear 36, carried by a countershaft 40. The countershaft gear serves to cause the main cam shaft 41 to be rotated at a predetermined speed, and for this purpose the twister reciprocating cam 24 is provided with gear teeth which mesh with the countershaft gear pinion 37. A cam shaft 42 carries the cams 21 and 22 and is connected to the main cam shaft 41 by means of a pair of bevel gears 43.

The main cam shaft 41 is rotatably mounted in suitable bearings 44 and 45, and upon this shaft is rotatably mounted the left-hand forming cam 46 and the right-hand forming cam 50. Slidably carried by the housing 20 of the machine is the left-hand forming slide 51 and the right-hand forming slide 52. These slides, as is customary, are mounted within suitable grooves or channels formed in the housing and are reciprocated back and forth by the forming cams 46 and 50, respectively, through the medium of forming slide rollers 53. As is customary in machines of this type, each of the forming slides 51 and 52 carries a pivotally mounted forming arm 57 at its forward end. Each of these arms carries a forming roller 54 which is guided in its movement when forming the stock into a link around the mandrel 55 by means of a cam shaped groove 56 formed between roller plates 60 and 61 secured to the top of the housing.

Figure 1:
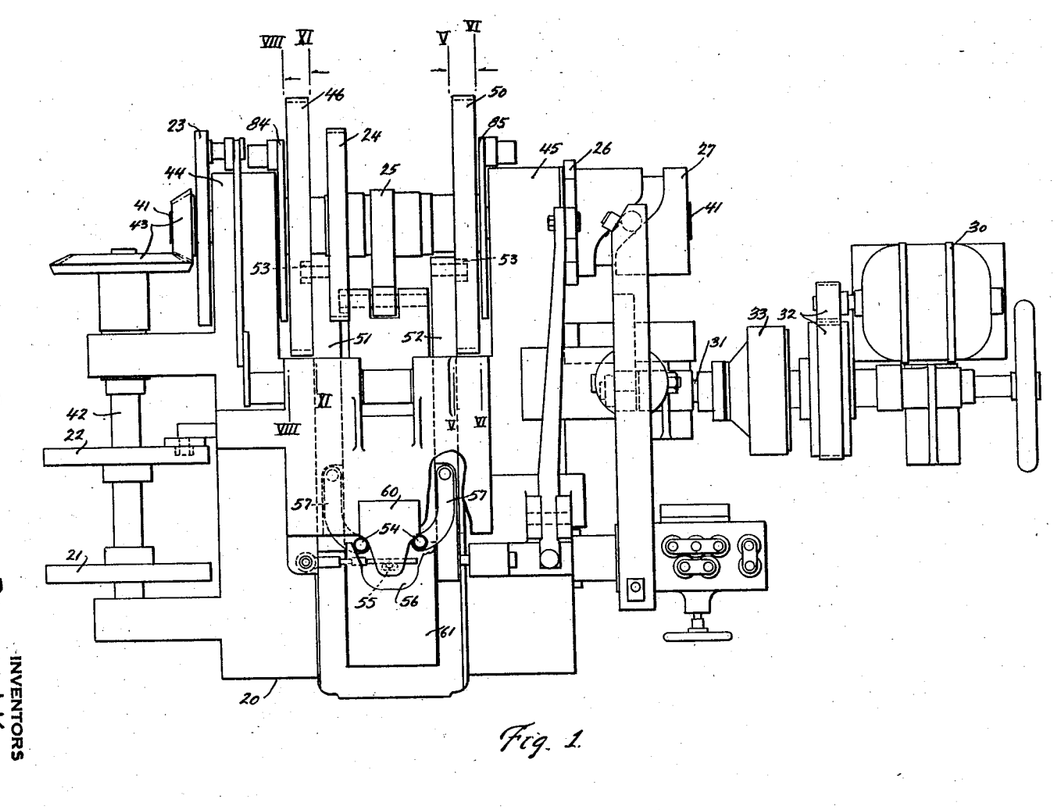
Fig. 1 is a plan view of our complete machine.
Figure 2:
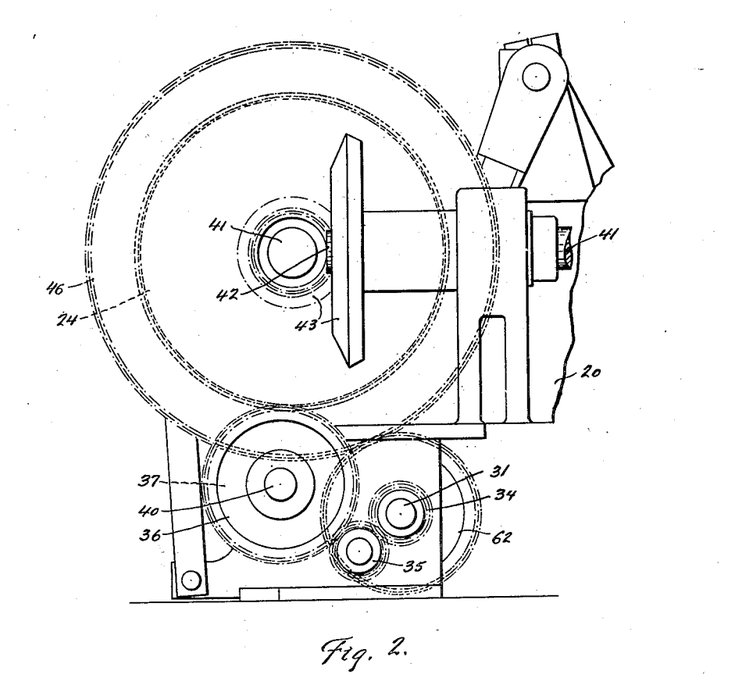
Fig. 2 is a fragmentary end elevation of the machine showing the gear drive thereof.
Figure 3:
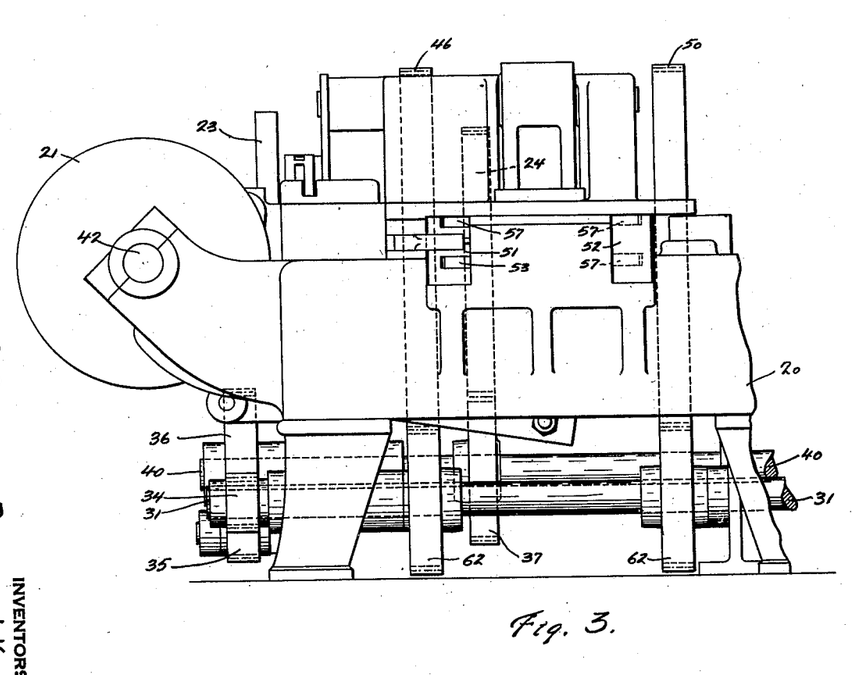
Fig. 3 is a fragmentary side elevation of parts of the machine shown in Fig. 2.

The forming slides 51 and 52, as hereinbefore indicated, are operated respectively by the left-hand forming cam 46 and the right-hand forming cam 50. These cams are rotatably mounted upon the main cam shaft 41 and have their outer peripheries formed with suitable gear teeth whereby they are rotated. Meshing with the gear teeth of each of these cams is a forming cam pinion 62 (see Fig. 3). These pinions are carried upon the main drive shaft 31 and are so proportioned with respect to the diameter of the forming cams that they cause these cams to be rotated at substantially twice the speed of rotation of the other cams of the device.

Figure 5:
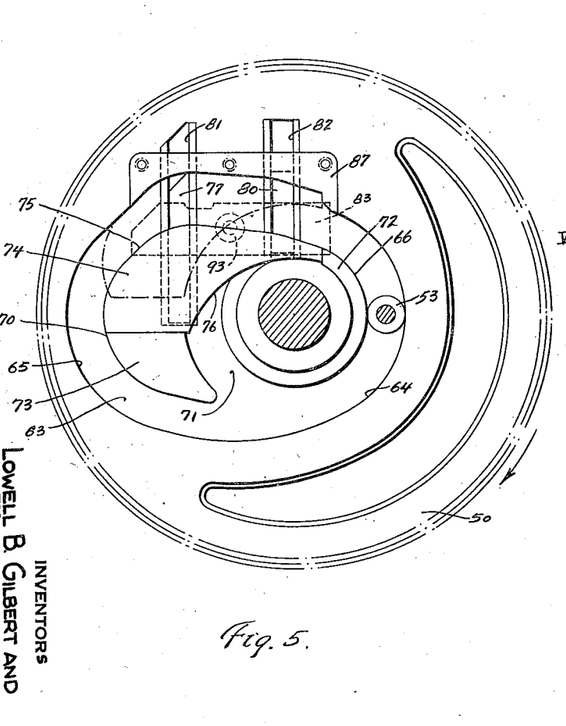
Fig. 5 is an enlarged sectional view taken on line V—V of Fig. 1 showing the cam face on the right-hand forming cam.
Figure 6:
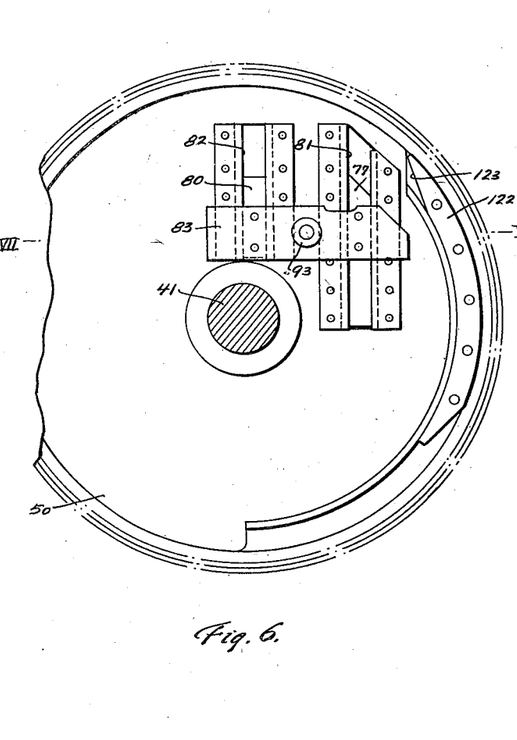
Fig. 6 is a similar view of the reverse side of the right-hand forming cam and is taken on line VI—VI of Fig. 1.
Figure 7:
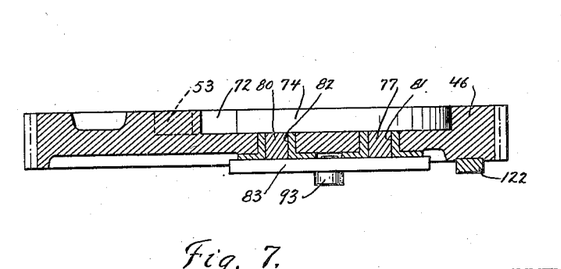
Fig. 7 is an enlarged sectional view taken on line VII—VII of Fig. 6.
Figure 11:
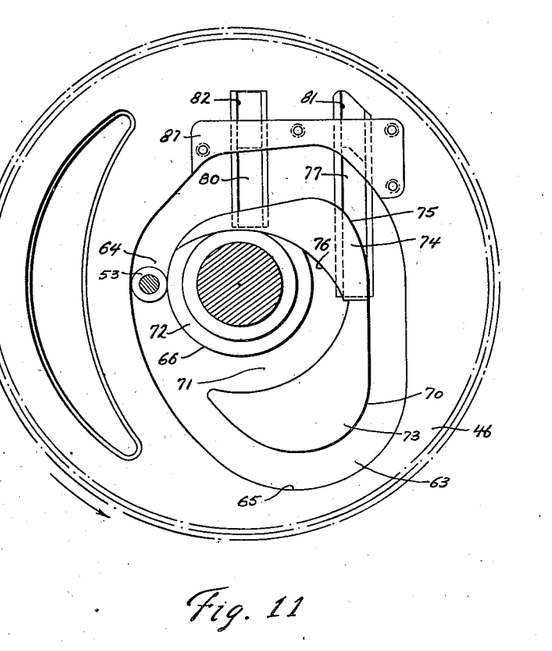
Fig. 11 is an enlarged sectional view of the cam side of the left-hand forming cam and is taken on line XI—XI of Fig. 1; and, Figs. 12 to 15 inclusive are enlarged fragmentary views showing the various sequential position of the parts during the cycle of operation.

Referring now to Figs. 5 and 6 where we show both sides of the left-hand forming cam and to Fig. 11 showing the cam face of the right-hand forming cam, it will be clear that both cams are substantially alike except that one of them is so formed as to move the associated slide and roller a distance slightly greater than corresponding movement of the other slide in order to carry its roller beyond the joint formed in the link. Obviously, since both ends of the blank are brought substantially together in the formation of the link, the rollers of the forming slides will be operated at different times so as not to interfere with each other. This is accomplished by arranging the irregular cam surfaces at substantially 90° from each other. These forming cams are of the usual face cam type giving motion in both directions and each is formed in one of its faces with a cam groove 63 formed by an outer cylindrical cam surface 64 substantially concentric with the axis of rotation and a connected outer irregular cam surface 65. The opposite side of the groove is formed by an inner cylindrical cam surface 66 concentric with the surface 64, and an inner irregular cam surface 70 opposite to the surface 65 and completing the groove 63. In addition to the connected grooves 64 and 65, the cam is also provided with a cylindrical groove 71 which is preferably concentric with the cylindrical groove portion 64 and substantially a continuation thereof, being formed on one side by the hub 72 of the cam and on the other side by the opposing surface of a stationary cam part 73. Each cam is so designed as to cause the forming slide roller 53 shown in Fig. 5 to be moved either within the cam groove 63 or the cylindrical groove 71. In order to cause the roller to travel in either of these two paths, the cam is provided with a movable portion 74 having an outer surface 75 and an inner surface 76. When this movable cam portion is in its operating position, as shown in Fig. 5, it will complete the irregular portion 65 of the groove 63. When, however, this movable cam portion is moved to the dot and dash line position, its surface 76 will complete the cylindrical groove 71 and cause the slide roller 53 to be guided into said groove. When the roller is in this groove it will not impart any longitudinal movement to the attached forming slide but will allow at least one complete idle rotation of the cam. In order to guide the movable part 74 of the cam, it is provided with two parallel slides 77 and 80 which are mounted respectively within grooves 81 and 82. The grooves are formed through the web of the cam and extend to the opposite side of the web. A cam plate 87 is inserted in the face of the wall of the cam and serves to span the grooves 81 and 82.

In order to operate the movable part 74 of the cam, we provide a shifter plate 83 which is arranged on the side of the cam web which is opposite the cam groove. This plate is suitably secured to the slides 77 and 80 of the movable part of the cam and therefore is reciprocated back and forth therewith.

Figure 8:
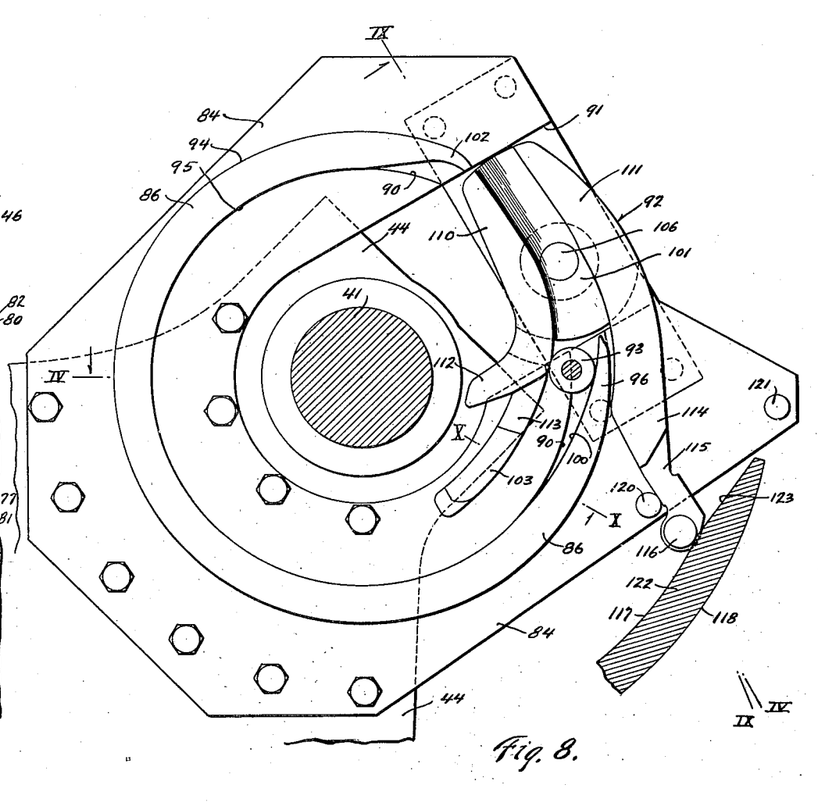
Fig. 8 is an enlarged sectional view showing the shifter track plate of the left-hand forming cam and is taken on line VIII—VIII of Fig. 1.
Figure 9:
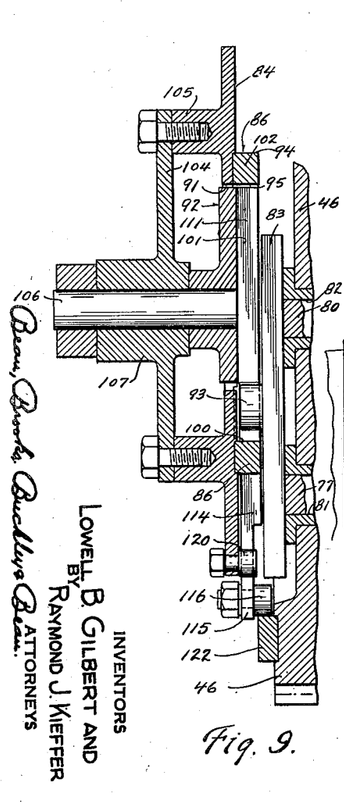
Fig. 9 is an enlarged sectional view taken on line IX—IX of Fig. 8.
Figure 10:
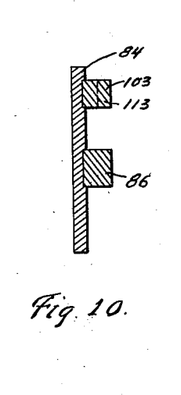
Fig. 10 is an enlarged fragmentary sectional view of the shifter plate taken on line X—X of Fig. 8.

A track plate 84 is arranged adjacent the cam 46 and a track plate 85 is arranged adjacent the cam 50. Each of these plates is substantially identical except that the parts thereof are arranged in reverse direction. In Fig. 8 we have shown a face view of the left-hand shifter plate 84. As here shown this plate is bolted to the main bearing 44 of the machine and it carries upon its outer face a shifter track 86 which is mounted in a groove 90 concentric with the main cam shaft 41. The plate is formed in one of its sides with an opening 91 within which is mounted a deflector 92. The shifter plate 83 carried by the movable cam portion 74 is provided with a shifter roller 93. This roller is alternately engageable with the outer surface 94 and the inner surface 95 of the shifter track. The deflector 92 is for the purpose of causing the shifter roller to move from one of these surfaces to the other. The shifter track is of course discontinued across the opening 91 of the track plate and the trailing end 96 thereof is formed with a curved inner surface 100 which is eccentric to the main path of the track so as to guide the shifter roller into the groove 101 of the deflector. The advance end 102 of the shifter track is shaped as shown to guide the shifter roller from the groove of the deflector onto either the outer or inner surface of the shifter track. An inner shifter track 103 is also carried by the track plate and is arranged preferably concentrically with the surface 100 of the shifter track 86 to cause the roller to follow the surface 100.

Spanning the opening 91 formed in the track plate is a bearing plate 104. This bearing plate is secured to spacing studs 105 carried by the rear surface of the track plate. The bearing plate 104 carries a bearing 107 for the deflector shaft 106. This shaft is carried by the deflector 92 and provides pivotal support for the deflector whereby it may be oscillated back and forth through its path of travel, as hereinafter described.

Figure 4:
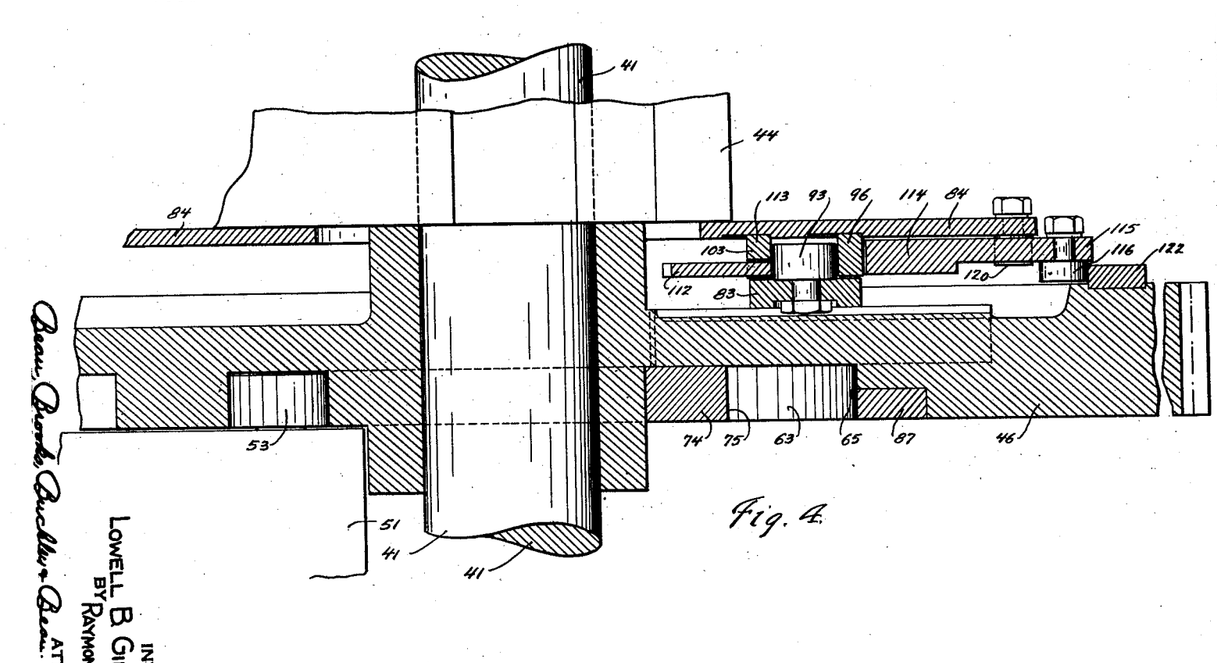
Fig. 4 is an enlarged fragmentary sectional plan view of certain portions of our device and is taken on line IV—IV of Fig. 8.

The groove 101 of the deflector is formed by an inner wall 110 and an outer wall 111. Extending downwardly and inwardly from the lower end of the wall 110 is an inner deflector arm 112 which extends across the shifter roller path when the deflector is in the position shown in Fig. 15. The engagement of the roller with the arm, when in this position, serves to move the deflector from the position shown in Fig. 14 to the position shown in Fig. 8, as will hereinafter be more fully described. The inner shifter track 103 is provided with a portion 113 having its upper surface below the surface of the major portion of the track so as to accommodate the inner deflector arm 112, as clearly shown in Fig. 4. The outer wall 111 is extended downwardly in the form of an outer deflector arm 114. As shown in Fig. 8 this deflector arm is arranged adjacent the outer surface 94 of the deflector track 86, so that when the shifter roller traveling around on the outside surface 94 of the track reaches the position shown in Fig. 12 it will cause the deflector to be moved from the position shown in this figure to the position shown in Fig. 13, in which position the shifter roller will be guided to the inner surface 95 of the track, as will hereinafter be more fully described.

The arm 114 is extended downwardly in a portion 115 of reduced thickness which portion carries a holding stud 116. Stops 120 and 121 carried by the track plate are so arranged as to engage the portion 115 of the outer deflector arm 114 when the deflector has been moved to either of the positions above described.

So as to retain the deflector 92 in the maximum shifted position during the travel of the shifter rollers through the groove 101 thereof, we provide a holding track 122 which is carried by the adjacent surface of the forming cam. This track is formed with an inner surface 117 and with an outer surface 118 for engagement with the holding stud 116 when it is in either of its maximum positions. The advance end of the inner surface 117 of the track is preferably formed with an inclined surface 123 so as to accommodate the holding stud, when in the position shown in Fig. 15.

While the shape of the actuating grooves of the left-hand and right-hand forming cams and shifters are slightly different in shape, for clearness of illustration the same numerals have been given to the left-hand cam shown in Fig. 11 as those given the parts of the right-hand cam shown in Fig. 5.

Figure 12:
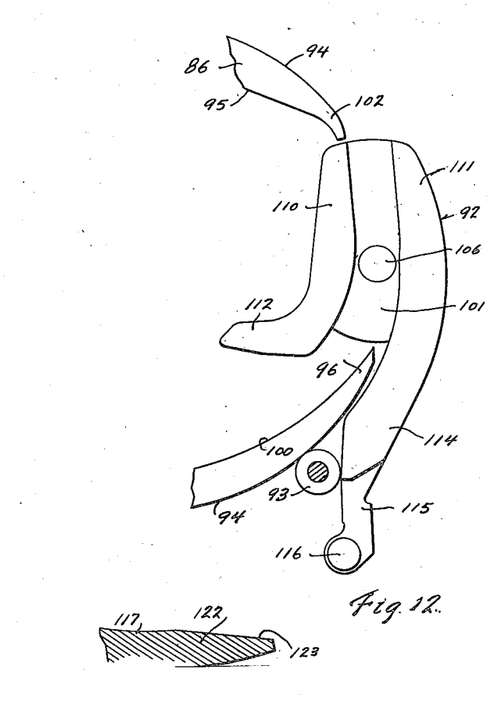
Figure 13:
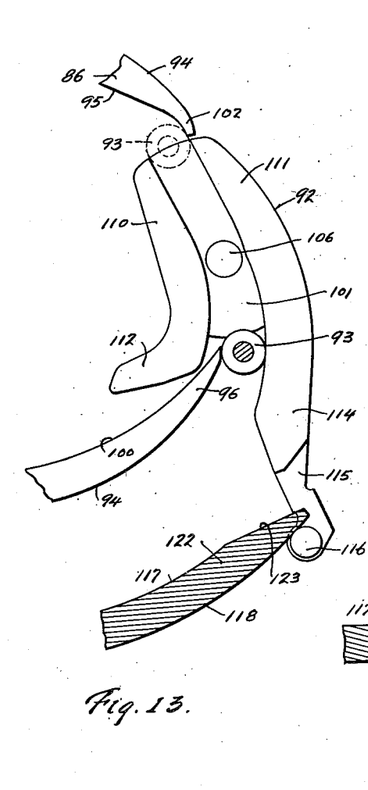
Figure 14:
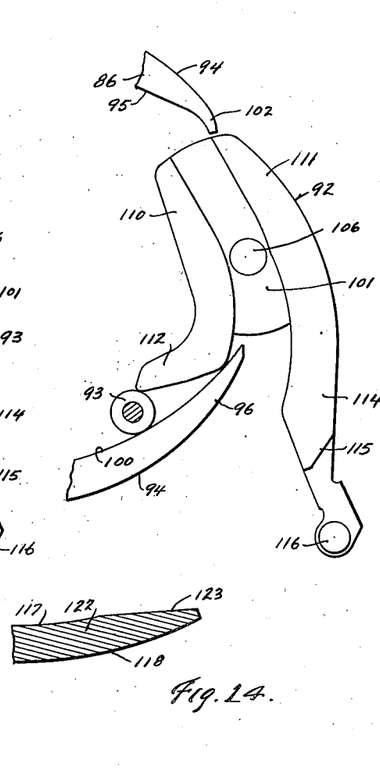
Figure 15:
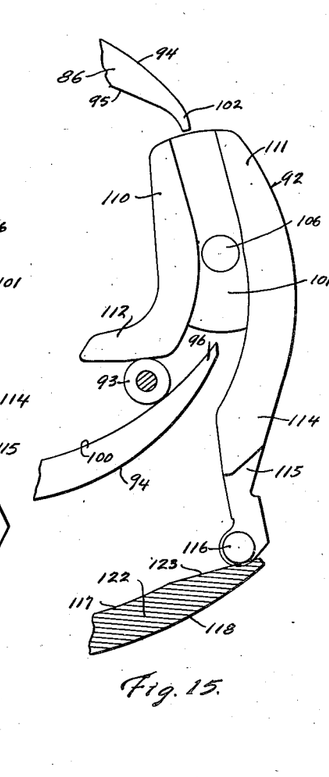

Referring now to Figs. 12 to 15 inclusive, the shifter roller 93 is shown in Fig. 12 as having completed its travel around the outer surface 94 of the shifter track and in position to engage the outer arm 114 of the deflector 92. As the roller continues to move in counterclockwise direction it will cause the deflector to be moved to the position shown in Fig. 13. The shifter roller 93 will move from this position into the groove 101 of the deflector and to a position of contact with the inner surface of the outer wall 111. As clearly shown in dotted lines in this figure, the roller will be guided by such inner surface to the advance end 102 of the shifter track where it will register with the inner surface 95 of the track. When the shifter roller has reached the position shown in Fig. 13, the holding track 122 carried by the cam will have been moved around to a position where its outer surface 118 will engage the inner surface of the holding stud 116 and thus retain the deflector in this position during the movement of the shifter roller therethrough from the position shown in full lines to that shown in dotted lines in Fig. 13. Since the portion 115 of the outer deflector arm 114 is reduced in thickness it will permit the holding track to pass over it during the movement just described. From the position shown in dotted lines in Fig. 13, the shifter roller will travel around the inner surface 95 of the shifter track, during which time the movable part 74 of the cam will be maintained in its operative position as shown in Fig. 5. When the shifter roller reaches the position shown in Fig. 14, it will ride against the surface 100 of the track 86 and will engage the inner deflector arm 112 and cause the deflector 92 to be moved to the position shown in Fig. 8. In moving from the position of Fig. 14 to Fig. 8, the roller will pass through the position shown in Fig. 15 where it will be seen that the inclined surface 123 of the advance end of the holding track 122 is moving over the outside surface of the holding stud 116. When the roller has, however, reached the position shown in Fig. 8 the holding track will have engaged the stud to hold the deflector in the position shown in that figure. When in the position of Fig. 8 it will be obvious that the deflector will guide the shifter roller onto the outer surface 94 of the shifter track. The holding track will hold the deflector in the position shown in Fig. 8 during the full travel of the shifter roller through the groove of the deflector.

What is claimed is:

1. In a chain forming machine, the combination with the forming slides and follower means carried by each slide, of a forming cam associated with each of the follower means for operating the slides, each of the cams having an irregular groove and a cylindrical groove for cooperation with the associated follower means, each cam having a movable portion for directing the follower means through either of said grooves, a shifter plate slidably carried by the cam and movable with the movable portion thereof, a shifter roller carried by said shifter plate, a track plate carried by the machine and arranged adjacent the cam, a shifter track carried by said track plate, connecting means carried by said cam portion for cooperation with either the inside or outside surfaces of said track, and means carried by said track plate for guiding said connecting means to the inside or outside surfaces of said track.

2. In a chain forming machine, the combination with the forming slides and follower means carried by each slide, of a forming cam associated with each of the follower means for operating the slides, each of the cams having an irregular groove and a cylindrical groove for cooperation with the associated follower means, each cam having a movable portion for directing the follower means through either of said grooves, a shifter plate slidably carried by the cam and movable with the movable portion thereof, a shifter roller carried by said shifter plate, a track plate carried by the machine and arranged adjacent the cam, a shifter track carried by said track plate, connecting means carried by said cam portion for cooperation with either the inside or outside surfaces of said track, a deflector carried by said track plate for guiding said connecting means to the inside and outside surfaces of said track, and means for causing said deflector to be operated in synchronism with the rotation of said forming cam.

3. In a chain forming machine, the combination with the forming slides and follower means carried by each slide, of a forming cam associated with each of the follower means for operating the slides, each of the cams having an irregular groove and a cylindrical groove for cooperation with the associated follower means, each cam having a movable portion for directing the follower means through either of said grooves, a shifter plate slidably carried by the cam and movable with the movable portion thereof, a shifter roller carried by said shifter plate, a track plate carried by the machine and arranged adjacent the cam, a shifter track carried by said track plate, connecting means carried by said cam portion for cooperation with either the inside or outside surfaces of said track, a deflector carried by said track plate for guiding said connecting means to the inside and outside surfaces of said track, said deflector having a guiding groove for the reception of said connecting means, means for causing said deflector to be operated in synchronism with the rotation of said forming cam, and means for retaining said deflector in either of its positions during passage of said connecting means therethrough.

4. In a chain forming machine, the combination with the forming slides and follower means carried by each slide, of a forming cam associated with each of the follower means for operating the slides, each of the cams having an irregular groove and a cylindrical groove for cooperation with the associated follower means, each cam having a movable portion for directing the follower means through either of said grooves, a shifter plate slidably carried by the cam and movable with the movable portion thereof, a shifter roller carried by said shifter plate, a track plate carried by the machine and arranged adjacent the cam, a shifter track carried by said track plate, connecting means carried by said cam portion for cooperation with either the inside or outside surfaces of said track, a deflector carried by said track plate for guiding said connecting means to the inside and outside surfaces of said track, and arms carried by said deflector and engageable by said connecting means to alternately operate said deflector from one guiding position to the other.

5. In a chain forming machine, the combination with the forming slides and follower means carried by each slide, of a forming cam associated with each of the follower means for operating the slides, each of the cams having an irregular groove and a cylindrical groove for cooperation with the associated follower means, each cam having a movable portion for directing the follower means through either of said grooves, a shifter plate slidably carried by the cam and movable with the movable portion thereof, a shifter roller carried by said shifter plate, a track plate carried by the machine and arranged adjacent the cam, a shifter track carried by said track plate, connecting means carried by said cam portion for cooperation with either the inside or outside surfaces of said track, a deflector carried by said track plate for guiding said connecting means to the inside and outside surfaces of said track, arms carried by said deflector and engageable by said connecting means to alternately operate said deflector from one guiding position to the other, and means for retaining said deflector in either position during passage of said connecting means therethrough.

6. A cam device, comprising a cam formed with a groove having an irregular part and a cylindrical part, a follower roller disposed within said groove, said cam having a movable portion for directing said roller through either of said groove parts, a track plate carried by the machine and arranged adjacent the cam, a shifter track carried by said track plate and having an inner and an outer peripheral working surface, connecting means carried by said cam portion for cooperation with the inside and outside of said track, and means carried by said track plate for guiding said connecting means to the inside and outside surfaces of said track.

7. A cam device, comprising a cam formed with a groove having an irregular part and a cylindrical part, a follower roller disposed within said groove, said cam having a movable portion for directing said roller through either of said groove parts, a track plate carried by the machine and arranged adjacent the cam, a shifter track carried by said track plate and having an inner and an outer peripheral working surface, connecting means carried by said cam portion for cooperation with the inside and outside of said track, a deflector carried by said track plate for guiding said connecting means to the inside and outside surfaces of said track, and means for causing said deflector to be operated in synchronism with the rotation of the cam.

8. A cam device, comprising a cam formed with a groove having an irregular part and a cylindrical part, a follower roller disposed within said groove, said cam having a movable portion for directing said roller through either of said groove parts, a track plate carried by the machine and arranged adjacent the cam, a shifter track carried by said track plate and having an inner and an outer peripheral working surface, connecting means carried by said cam portion for cooperation with the inside and outside of said track, a deflector carried by said track plate for guiding said connecting means to the inside and outside surfaces of said track, means for causing said deflector to be operated in synchronism with the rotation of the cam, and means carried by said cam for retaining said deflector in either of its guiding positions during passage of said connecting means therethrough.

9. A cam device, comprising a cam formed with a groove having an irregular part and a cylindrical part, a follower roller disposed within said groove, said cam having a movable portion for directing said roller through either of said groove parts, a track plate carried by the machine and arranged adjacent the cam, a shifter track carried by said track plate, and having an inner and an outer peripheral working surface, connecting means carried by said cam portion for cooperation with said track, a deflector carried by said track plate for guiding said connecting means to the inside and outside surfaces of said track, and arms carried by said deflector for disposition across the path of travel of said connecting means for operating said deflector from one guiding position to the other.

10. A cam device, comprising a cam formed with a groove having an irregular part and a cylindrical part, a follower roller disposed within said groove, said cam having a movable portion for directing said roller through either of said groove parts, a track plate carried by the machine and arranged adjacent the cam, a shifter track carried by said track plate and having an inner and an outer peripheral working surface, connecting means carried by said cam portion for cooperation with said track, a deflector carried by said track plate for guiding said connecting means to the inside and outside surfaces of said track, arms carried by said deflector for disposition across the path of travel of said connecting means for operating said deflector from one guiding position to the other, a retaining stud carried by one of said deflector arms, and a holding track carried by said cam for cooperation with said stud when said connecting means are being transferred by said deflector from one side of said shifter track to the other.

11. A cam device, comprising a cam formed with a groove having an irregular part and a cylindrical part, a follower roller associated with the cam and disposed in the groove thereof, a movable cam portion for directing said roller into either of said groove parts, a shifter roller movable with said cam portion, a track plate arranged adjacent the cam and having an opening, a shifter track carried by said plate and having an inner and an outer peripheral working surface and having its ends terminating substantially at the plate opening, and a deflector pivotally mounted in said opening for oscillation between the ends of said track for guiding said shifter roller alternately to the inside and outside surfaces of said track.

12. A cam device, comprising a cam formed with a groove having an irregular part and a cylindrical part, a follower roller associated with the cam and disposed in the groove thereof, a movable cam portion for directing said roller into either of said groove parts, a shifter roller movable with said cam portion, a track plate arranged adjacent the cam and having an opening, a shifter track carried by said plate and having an inner and an outer peripheral working surface and having its ends terminating substantially at the plate opening, a deflector pivotally mounted within said plate opening to oscillate between the ends of said track for guiding said shifter roller alternately to the inside and outside surfaces of said track, and arms carried by said deflector for engagement with said shifter for oscillating said deflector to its extreme positions in either direction.

13. A cam device, comprising a cam formed with a groove having an irregular part and a cylindrical part, a follower roller associated with the cam and disposed in the groove thereof, a movable cam portion for directing said roller into either of said groove parts, a shifter roller movable with said cam portion, a track plate arranged adjacent the cam and having an opening, a shifter track carried by said plate and having an inner and an outer peripheral working surface and having its ends terminating substantially at the plate opening, a deflector pivotally mounted within said plate opening to oscillate between the ends of said track for guiding said shifter roller alternately to the inside and outside surfaces of said track, an inner deflector arm, and an outer deflector arm, said arms being carried by said deflector and alternately movable across the path of the shifter roller at the inside and outside surfaces of said track.

14. A cam device, comprising a cam formed with a groove having an irregular part and a cylindrical part, a follower roller associated with the cam and disposed in the groove thereof, a movable cam portion directing said roller into either of said groove parts, a shifter roller movable with said cam portion, a track plate arranged adjacent the cam and having an opening, a shifter track carried by said plate and having an inner and an outer peripheral working surface and having its ends terminating substantially at the plate opening, a deflector pivotally mounted within said plate opening to oscillate between the ends of said track for guiding said shifter roller alternately to the inside and outside surfaces of said track, an inner deflector arm, an outer deflector arm, said arms being carried by said deflector and alternately movable across the path of the shifter roller at the inside and outside surfaces of said track, and stops carried by said track plate and engageable with said outer deflector arm for limiting the movement of said deflector.

15. A cam device, comprising a cam formed with a groove having an irregular part and a cylindrical part, a follower roller associated with the cam and disposed in the groove thereof, a movable cam portion for directing said roller into either of said groove parts, a shifter roller movable with said cam portion, a track plate arranged adjacent the cam and having an opening, a shifter track carried by said plate and having an inner and an outer peripheral working surface and having its ends terminating substantially at the plate opening, a deflector pivotally mounted within said plate opening to oscillate between the ends of said track for guiding said shifter roller alternately to the inside and outside surfaces of said track, an inner deflector arm, an outer deflector arm, said arms being carried by said deflector and alternately movable across the path of the shifter roller at the inside and outside surfaces of said track, a retaining stud carried by one of said deflector arms, and a holding track carried by said cam, said track serving to engage said stud when said deflector is in either of its operative positions.

16. A cam device, comprising a cam formed with a groove having an irregular part and a cylindrical part, a follower roller associated with the cam and disposed in the groove thereof, a movable cam portion for directing said roller into either of said groove parts, a shifter roller movable with said cam portion, a track plate arranged adjacent the cam and having an opening, an outer shifter track having an inner and an outer peripheral working surface, said outer track being carried by said plate and leaving its ends terminating substantially at the plate opening, an inner shifter track carried by said plate disposed opposite the trailing end of the outer track and in spaced relation therewith, and a deflector mounted in said plate opening for oscillation between the ends of said outer track for guiding said shifter roller alternately to the inside and outside surfaces of said shifter track.

17. In a chain forming machine, the combination with the forming slides and follower means carried by each slide, of a forming cam associated with each of the follower means for operating the slides, each of the cams having an irregular groove and a cylindrical groove for cooperation with the associated follower means, each cam having a movable portion for directing the follower means through either of said grooves, a shifter plate slidably carried by the cam and movable with the movable portion thereof, a shifter roller carried by said shifter plate, means for guiding said shifter roller in its predetermined path, and means carried by said cam for retaining said guiding means in position while said roller is passing therethrough.

18. In a chain forming machine, the combination with the forming slides and follower means carried by each slide, of a forming cam associated with each of the follower means for operating the slides, each of the cams having an irregular groove and a cylindrical groove for cooperation with the associated follower means, each cam having a movable portion for directing the follower means through either of said grooves, a shifter plate slidably carried by the cam and movable with the movable portion thereof, a shifter roller carried by said shifter plate, a shifter track carried by said machine, a deflector for guiding said shifter roller to the inside and outside surface of said shifter track, and a holding track carried by said cam for retaining said deflector in its selected position while the roller is passing therethrough.

19. A chain forming machine having a main cam shaft, means for operating said shaft at suitable speed, chain forming cams rotatably mounted upon said shaft, forming slides for said machine, a follower roller carried by each of said slides and cooperating with said forming cams, each of said forming cams having an irregular groove formed with a relatively wide curved working surface having relatively gradual approaches, a cylindrical groove, movable means carried by the cam for shifting said follower roller from one of said grooves to the other, whereby said slides will have at least one idle stroke to each actuating stroke, and means for rotating said forming cams at a higher rate of speed than the speed of the main shaft.

20. A chain forming machine having a main cam shaft, means for operating said shaft at a suitable speed, chain forming cams rotatably mounted upon said shaft, forming slides for said machine, a follower roller carried by each of said slides and cooperating with said forming cams, each of said forming cams having an irregular groove formed with a relatively wide curved working surface having relatively gradual approaches, a cylindrical groove, a movable cam portion for shifting said follower roller from one of said grooves to the other, a shifter roller carried by said cam portion, a deflector for guiding said shifter roller to move said cam portion to its maximum positions, means for oscillating said deflector, whereby said slides will have at least one idle stroke to each actuating stroke, means for retaining said deflector in its oscillated positions, and means for rotating said forming cams at a higher rate of speed than the speed of the main shaft.

21. A chain forming machine having a main cam shaft, means for operating said shaft at a suitable speed, chain forming cams rotatably mounted upon said shaft, forming slides for said machine, a follower roller carried by each of said slides and cooperating with said forming cams, each of said forming cams having an irregular groove formed with a relatively wide curved working surface having relatively gradual approaches, a cylindrical groove, a movable cam portion for shifting said follower roller from one of said grooves to the other, a shifter roller carried by said cam portion, a deflector for guiding said shifter roller to move said cam portion to its maximum positions, means for oscillating said deflector, whereby said slides will have at least one idle stroke to each actuating stroke, a stationary shifter track for guiding said shifter roller, a holding track carried by said cam for retaining said deflector in either of its operative positions, and means for rotating said forming cams at a higher rate of speed than the speed of the main shaft.

22. In a chain forming machine, the combination with the forming slides and follower means carried by each slide, of a forming cam associated with each of the follower means for operating the slides, each cam having a stationary part and a movable part slidably mounted for movement in a lineal direction from one extreme position to another for association with said stationary part to provide the cam with an irregular groove and a cylindrical groove, roller means carried by said movable part for shifting it from one extreme position to the other, stationarily arranged annular means adjacent said cam and associated with said roller means to retain said movable part in either of said positions, and oscillating means actuated by said roller means for shifting said movable part alternately to the retained positions.

23. In a chain forming machine, the combination with the forming slides and follower means carried by each slide, of a forming cam associated with each of the follower means for operating the slides, each of the cams having an irregular groove and a cylindrical groove for cooperation with the associated follower means, each cam having a movable portion for directing the follower means through either of said grooves, a shifter plate slidably carried by the cam and movable with the movable portion thereof, a shifter roller carried by said shifter plate, and a stationary annular shifter track carried by said machine and having an inner and an outer peripheral working surface, said roller being engageable with either of said inner or outer surfaces of said track during a substantial portion of each complete rotation of said cam for holding said movable cam portion in either selected position.

24. In a chain forming machine, the combination with the forming slides and follower means carried by each slide, of a forming cam associated with each of the follower means for operating the slides, each of the cams having an irregular groove and a cylindrical groove for cooperation with the associated follower means, each cam having a movable portion for directing the follower means through either of said grooves, a shifter plate slidably carried by the cam and movable with the movable portion thereof, a shifter roller carried by said shifter plate, a stationary annular shifter track having an outer and an inner peripheral working suface, said track having an opening in its periphery, said roller being continuously engageable with either of said outer or inner track surfaces to hold said cam portion in either selected position, and selector means pivotally mounted in the opening of said track and formed with a groove for shifting said roller from one track periphery to the other.

LOWELL B. GILBERT.
RAYMOND J. KIEFFER.

REFERENCES CITED

The following references are of record in the file of this patent:

UNITED STATES PATENTS

| Number | Name | Date |
|---|---|---|
| 447,652 | Alvord | Mar. 2, 1891 |
| 1,814,757 | Lucas | July 14, 1931 |